US008057584B2

(12) United States Patent
Schubert et al.

(10) Patent No.: US 8,057,584 B2
(45) Date of Patent: Nov. 15, 2011

(54) PRESSURISED GAS CONTAINER OR STORAGE MEANS CONTAINING A GAS PRESSURISED CONTAINER WITH FILTER MEANS

(75) Inventors: Markus Schubert, Ludwigshafen (DE); Ulrich Müller, Neustadt (DE); Michael Hesse, Worms (DE); Kerstin Schierle-Arndt, Zwingenberg (DE); Kai Oertel, Stuttgart (DE); Ian Faye, Stuttgart (DE); Thorsten Allgeier, Untergruppenbach (DE); Jan-Michael Graehn, Stuttgart (DE)

(73) Assignee: BASF SE, Ludwigshafen (DE)

( * ) Notice: Subject to any disclaimer, the term of this patent is extended or adjusted under 35 U.S.C. 154(b) by 226 days.

(21) Appl. No.: 12/299,330

(22) PCT Filed: Apr. 26, 2007

(86) PCT No.: PCT/EP2007/054092

§ 371 (c)(1), (2), (4) Date: Nov. 3, 2008

(87) PCT Pub. No.: WO2007/128701

PCT Pub. Date: Nov. 15, 2007

(65) Prior Publication Data

US 2009/0133576 A1 May 28, 2009

(30) Foreign Application Priority Data

May 4, 2006 (DE) ......................... 10 2006 020 852

(51) Int. Cl.
*F17C 11/00* (2006.01)
*B01D 53/02* (2006.01)

(52) U.S. Cl. ............................ 96/108; 206/0.7; 502/526

(58) Field of Classification Search .................... 96/108; 95/90, 116; 206/0.7; 423/648.1, 658.2; 502/526; 220/581

See application file for complete search history.

(56) References Cited

U.S. PATENT DOCUMENTS

| | | | | |
|---|---|---|---|---|
| 1,821,549 | A * | 9/1931 | Hornor et al. | 422/188 |
| 4,343,770 | A * | 8/1982 | Simons | 422/112 |
| 4,483,461 | A * | 11/1984 | Igarashi | 222/3 |
| 4,522,159 | A | 6/1985 | Engel et al. | |
| 4,600,525 | A * | 7/1986 | Baker et al. | 420/443 |
| 5,648,508 | A | 7/1997 | Yaghi | |
| 5,980,599 | A * | 11/1999 | Chris et al. | 55/312 |
| 6,444,016 | B2 | 9/2002 | Oshima et al. | |
| 6,572,688 | B2 * | 6/2003 | Irven et al. | 96/135 |
| 6,651,701 | B2 * | 11/2003 | Kuriiwa et al. | 141/4 |
| 7,119,219 | B2 | 10/2006 | Mueller et al. | |
| 7,160,359 | B2 * | 1/2007 | Vincent et al. | 95/90 |
| 7,481,866 | B2 * | 1/2009 | MacGillivray et al. | 95/90 |
| 7,517,396 | B2 * | 4/2009 | Arnold et al. | 96/126 |
| 2001/0027724 | A1 * | 10/2001 | Oshima et al. | 96/135 |
| 2001/0039803 | A1 * | 11/2001 | Stetson et al. | 62/46.2 |
| 2002/0100369 | A1 | 8/2002 | Kuriiwa et al. | |
| 2005/0016186 | A1 | 1/2005 | Tom | |
| 2005/0287407 | A1 | 12/2005 | Bushko | |
| 2006/0054022 | A1 * | 3/2006 | Hosoe et al. | 96/108 |
| 2006/0252641 | A1 * | 11/2006 | Yaghi et al. | 502/401 |
| 2007/0227898 | A1 | 10/2007 | Muller et al. | |

FOREIGN PATENT DOCUMENTS

| | | | |
|---|---|---|---|
| CN | C 1246622 | | 3/2000 |
| DE | 10110169 | A1 | 9/2001 |
| DE | 10111230 | A1 | 9/2002 |
| DE | 10355087 | A1 | 6/2005 |
| EP | 0200260 | A2 | 12/1986 |
| EP | 01025444 | B1 | 6/1988 |
| EP | 0389041 | A1 | 9/1990 |
| EP | 0592050 | A1 | 4/1994 |
| EP | 0709253 | A1 | 5/1996 |
| EP | 1271046 | A2 | 1/2003 |
| JP | 3-37156 | A | 2/1991 |
| JP | 2002-054798 | A * | 2/2002 |
| JP | 2002-267096 | A | 9/2002 |
| JP | 2003-278997 | A | 10/2003 |
| WO | WO-94/13584 | A1 | 6/1994 |
| WO | WO-94/29408 | A1 | 12/1994 |
| WO | WO-95/19222 | A1 | 7/1995 |
| WO | WO-2005-049892 | A1 | 6/2005 |

OTHER PUBLICATIONS

Machine generated English translation of JP 2002-054798 A, published Feb. 2002.*

* cited by examiner

*Primary Examiner* — Frank Lawrence, Jr.
(74) *Attorney, Agent, or Firm* — Connolly Bove Lodge & Hutz LLP

(57) ABSTRACT

Hydrogen or methane gas pressure container having a minimum volume of 1 $m^3$ a prescribed maximum filling pressure, has a filter through which oxygen, methane respectively, can flow during uptake. The filter has an adsorbent for adsorbing impurities selected from the group consisting of a higher hydrocarbon, ammonia, an odorous substance, hydrogen sulfide and a mixture of two or more of these substances. The pressure container and the filter comprise porous metal organic frameworks as adsorbent.

3 Claims, No Drawings

PRESSURISED GAS CONTAINER OR STORAGE MEANS CONTAINING A GAS PRESSURISED CONTAINER WITH FILTER MEANS

RELATED APPLICATIONS

This application is a national stage application (under 35 U.S.C. §371) of PCT/EP2007/054092, filed Apr. 26, 2007, which claims benefit of German application 102006020852.8, filed May 4, 2006.

The present invention relates to a gas pressure container and its use for filling a further gas pressure container.

Gas-aided motor vehicles form an alternative to conventional vehicles which are powered by petrol or diesel fuel.

However, the high pressures which appropriate storage vessels have to have represent a technical problem here. It is known that the pressure necessary in a storage vessel such as a tank in order to store a sufficient amount of gas can be reduced when an adsorbent is provided in the tank. This adsorbent enables the necessary pressure in the vessel to be reduced for the same amount of gas.

A motor vehicle having such a container comprising an adsorbent is disclosed in JP A 2002/267096.

However, this does not solve the problem of how such a vehicle is to be filled.

To solve this problem, JP-A 2003/278997 proposes filling a container in a vehicle by direct connection to a town gas line, with a compressor being provided in between.

However, this has the disadvantage of dependence on the presence of a town gas line. In addition, a compressor is required for fuelling and this is associated with production of noise during fuelling of the vehicle. In addition, the adsorbent used is not protected against impurities which may be present as components in the town gas.

There is therefore a need for a gas pressure container which can be, for example, part of a filling station which allows filling of a motor vehicle in a manner having a simplicity comparable to that prevailing at present for gas-powered vehicles having a pressure container without an adsorbent and in which the adsorbent is protected against impurities.

It is thus an object of the present invention to provide such containers.

The object is achieved by a gas pressure container having a minimum volume of 1 $m^3$ and a prescribed maximum filling pressure for the uptake, storage and delivery of a fuel gas which is gaseous under storage conditions and is suitable for powering a vehicle by combustion of the fuel gas, wherein the gas pressure container has a filter through which the fuel gas can flow at least during uptake or during delivery, with the filter being suitable for removing possible impurities in the fuel gas from the stream and the impurities being able to reduce the storage capacity for the fuel gas of an adsorbent used for the storage of the fuel gas.

It has been found that it is advantageous to equip the gas pressure container which is to serve for fuelling a vehicle with a filter which protects the adsorbent used for the storage of the fuel gas.

The fuel gas can be a pure gas or a gas mixture and is suitable for powering a vehicle by combustion of the fuel gas. The fuel gas therefore typically comprises at least one of the gases hydrogen or methane. For economic reasons, use is made not of the pure gases but rather gases from natural sources which comprise the pure gases hydrogen and/or methane. These are preferably town gas or natural gas. Very particular preference is given to natural gas.

The fuel gas is gaseous under storage conditions. This means that the fuel gas is present in the gaseous state of matter in the gas pressure container. Accordingly, the fuel gas is in the gaseous state up to a pressure which corresponds to the maximum filling pressure of the gas pressure container. This should be the case for a temperature range up to −20° C.

Furthermore, the gas pressure container has a filter through which the fuel gas can flow at least during uptake or during delivery, with the filter being suitable for removing possible impurities in the fuel gas from the stream and the impurities being able to reduce the storage capacity for the fuel gas of the adsorbent used for storage of the fuel gas.

The task of the filter is thus to protect an adsorbent used against impurities in order to ensure that it has sufficient storage capacity for the fuel gas.

These impurities can be at least one higher hydrocarbon, ammonia or hydrogen sulfide or a mixture of two or more of these substances. Carbon dioxide and/or carbon monoxide may also be such impurities. In addition, at least one odorous substance can likewise be an impurity. An example of such an odorous substance is tetrahydrothiophene. In addition, numerous gaseous foreign substances by means of which the fuel gas can be contaminated and which can specifically affect the adsorbent in an adverse manner are possible.

Examples of higher hydrocarbons are ethane, propane, butane, and further higher alkanes and also their unsaturated analogues.

The type of impurity depends on the fuel gas used and on the method of producing or extracting it.

These impurities have an adverse effect in that they reduce the storage capacity of the adsorbent for the fuel gas. Such a reduction can, in particular, be due to reversible or irreversible adsorption on the adsorbent. However, it is likewise possible for not only adsorption but also a chemical reaction with the adsorbent to occur so that its storage capacity for the fuel gas is reduced.

The adsorbent used can be present in the gas pressure container of the invention. A further possibility is that the adsorbent used is present in a further gas pressure container which is located in or on a vehicle. Here, the filter can prevent impairment of the storage capacity for the fuel gas of the adsorbent used in the further gas pressure container in or on the vehicle by impurities during filling of this further gas pressure container.

Finally, there is the possibility that an adsorbent can be present both in the gas pressure container according to the invention and in the further gas pressure container, with these adsorbents being able to be identical or different.

For the purposes of the present invention, the term "adsorbent" is, in the interests of simplicity, also used for the case when a mixture of a plurality of adsorbents is employed.

Likewise, the term "filter" is used in the interests of simplicity for the purposes of the present invention even when a plurality of filters is employed.

The fuel gas can flow through the filter while it is being taken up in the gas pressure container of the invention. As a result, the fuel gas is purified for storage with the aim of later delivery to a vehicle. This is particularly advantageous when an adsorbent is used in the gas pressure container of the invention. In this way, impairment of the storage capacity for the fuel gas of the adsorbent used in the gas pressure container of the invention by impurities can be avoided.

The uptake of the fuel gas in the gas pressure container of the invention can be effected by means known from the prior art for the uptake of the fuel gas. It is possible here to use conventional valve technology, with a feed line which leads to the gas pressure container and which advantageously has at least one valve advantageously being present. The filter can, for example, represent part of the feed line, with further components also being able to be present. In addition, it is also possible for a plurality of feed lines which can correspondingly comprise a plurality of filters or no filters to be present.

In addition, the feed line to the gas pressure container for the uptake of the fuel gas in the gas pressure container can also serve for delivery of the fuel gas. Here, the fuel gas can flow through the filter again. However, it is likewise possible for the feed line which at the same time represents the discharge line to have a bypass which enables the gas to go around the filter. Likewise, further lines which serve for uptake and/or delivery and which have no filter can also be present.

If the uptake of the fuel gas in the gas pressure container of the invention and the delivery from the gas pressure container take place at different points, it is not necessary for the means for taking up the fuel gas in the gas pressure container of the invention to be equipped with the filter. As an alternative, only the means for delivery of the fuel gas can be provided with a filter so that the fuel gas flows through the filter when it is delivered.

The means for delivery can also comprise conventional valve and line technology. These should be dimensioned so that filling of a further pressure container in or on a vehicle takes not more than 3-5 minutes.

Particularly when a further gas pressure container to be filled has an adsorbent, the means for delivery of the fuel gas can additionally comprise means of cooling (for example in the form of at least one feed line and discharge line with cooling liquid). The evolution of heat during filling can in this way be compensated by the heat of adsorption.

It is likewise possible for the means for delivery of the fuel gas to additionally have a suction line which leads expanded fuel gas which has flowed through or around the further gas pressure container for the purpose of cooling back into the gas pressure container according to the invention.

An analogous situation also applies to the means for taking up the fuel gas in the gas pressure container of the invention.

A gas pressure container in the case of which the fuel gas flows through the filter only during delivery of the fuel gas is particularly suitable when the gas pressure container has no adsorbent and in addition is to be employed for conventional gas filling of vehicles in which the gas pressure container present in the vehicle has no adsorbent for storage of the fuel gas. Here, the gas pressure container can be used in a dual capacity if means for delivery of the fuel gas which have no filter are present. The conventional delivery of the fuel gas to a gas-powered vehicle known from the prior art is thus possible, with the use of the filter not being necessary here and this therefore preferably being bypassed. If the fuel gas is then to be delivered to a vehicle whose further gas pressure container has an adsorbent for the storage of the fuel gas, the fuel gas can be delivered through the filter so that the adsorbent present in the vehicle is protected against impurities.

Finally, there is also the possibility that the fuel gas flows through the filter both during uptake and during delivery. This can, as indicated above, be achieved by the means for the uptake of the fuel gas in the gas pressure container according to the present invention also serving for delivery of the fuel gas. When the means for the uptake are not simultaneously utilized for delivery, this can be realized by both the means for uptake and the means for delivery having a filter. In such a case, a plurality of separate filters are therefore necessary.

If the gas pressure container does not have an adsorbent for storage of the fuel gas, it is advantageous for the maximum filling pressure to be 300 bar (absolute). This value corresponds approximately to the maximum filling pressure which is adhered to in conventional filling systems for gas-powered motor vehicles when these do not have an adsorbent for storage of the fuel gas. Since, however, the pressure in a further gas pressure container which is present in or on a vehicle can be smaller when an adsorbent for storage of the fuel gas is present in order to store the same amount of fuel gas, the maximum filling pressure of the gas pressure container according to the invention can also be lower than 300 bar (absolute). The maximum filling pressure for the gas pressure container according to the invention is therefore preferably 200 bar (absolute). However, the maximum filling pressure should be above 100 bar in order to ensure a sufficient pressure drop for delivery of the fuel gas to the further gas pressure container in or on the vehicle. Accordingly, the maximum filling pressure for the further gas pressure container which is located in or on a vehicle is 100 bar (absolute), preferably 80 bar (absolute), more preferably 50 bar (absolute). However, this should not be below 10 bar (absolute).

If an adsorbent for storage of the fuel gas is present in the gas pressure container according to the invention, what has been said with regard to the further gas pressure container which is present in or on a vehicle applies to this gas pressure container. Accordingly, the prescribed maximum filling pressure for the gas pressure container according to the invention can also be less than 300 bar (absolute). This is of particular importance because a cheaper construction of the gas pressure container is possible as a result of the lower maximum pressure. The maximum filling pressure of a gas pressure container according to the invention which has an adsorbent for storage of the fuel gas is therefore preferably 150 bar (absolute). The maximum filling pressure is preferably 100 bar (absolute), more preferably 90 bar (absolute). However, it has to be ensured that, in particular, a pressure drop from the gas pressure container according to the invention to the further gas pressure container in or on a vehicle in the direction of the vehicle is present.

Owing to the lower maximum filling pressure required for a gas pressure container according to the invention when an adsorbent for storage of the fuel gas is present, it is advantageous to regulate the volume flow by means of larger cross sections compared to conventional gas pressure containers for filling gas-powered vehicles in appropriate lines for delivery of the fuel gas so as to ensure a volume flow which is similarly high to the case where a gas pressure container in the high-pressure range (maximum filling pressure 300 bar) is used.

If, for example, the pressure in the gas pressure container according to the invention is 100 bar (instead of 300 bar), the valve for delivery of the fuel gas should, to achieve an approximately equal filling time for the further gas pressure container, have a cross section which is by about a factor of 3 larger.

The gas pressure container of the invention can, as indicated above, have means for uptake and means for delivery of the fuel gas, with a filter being comprised in at least one case. Here, feed lines and/or discharge lines which have such a filter and are additionally equipped with appropriate valves are usually employed. In addition, further components can be present. Reference may here be made, in particular, to sensors which examine the quality of the fuel gas. Such sensors can be present upstream of the filter or downstream thereof. In addition, regulation instrumentation may be provided to close existing valves at appropriately too high an impurities content in order to prevent the storage capacity for the fuel gas of the adsorbent used for storage of the fuel gas from being adversely affected.

Such sensor and regulation technology are known to those skilled in the art.

The means for uptake of the fuel gas in the gas pressure container of the invention can additionally comprise a compressor which serves for filling the gas pressure container and can build up the necessary pressure.

A person skilled in the art will likewise know how such a filter has to be constructed and the dimensions necessary. The latter depends ultimately on the quality of the fuel gas to be used. The filter can, for example, be in the form of an exchangeable cartridge or be an integral part of a feed and/or discharge line. The impurities are typically bound by adsorption on an appropriate adsorbent in the filter. Here too, appropriate systems are known to those skilled in the art. Suitable adsorbents are metal oxides, molecular sieves, zeolites, activated carbon and the porous metal organic frameworks described in more detail below and also mixtures of these. Combination filters comprising a plurality of different adsorbents which have been optimized for particular impurities are particularly suitable.

Accordingly, it is possible to use one or more filters which comprise different adsorbents for separating off the impurities. The adsorbents used in the filter for separating off the impurities from the fuel gas can, if appropriate, be regenerated after removal from the filter or without being removed. This can be achieved, for example, by heating. There is generally the possibility of removing such impurities by pressure swing adsorption or temperature swing adsorption or combinations thereof.

The filter is typically preceded by a desiccant which removes any moisture (water) present from the fuel gas.

It can be advantageous to provide a plurality of feed lines and/or discharge lines which have a filter, with the uptake and/or delivery of the fuel gas occurring so that at least one line serves for uptake or delivery via a filter and the filter in at least one further line has been regenerated at the same time.

To ensure a sufficient stock of the fuel gas, the gas pressure container of the invention has a minimum volume of 1 $m^3$. The gas pressure container advantageously has a minimum volume of 10 $m^3$, more preferably greater than 100 $m^3$.

For the purposes of the present invention, the term “gas pressure container” is in the interests of simplicity also used for the case where a plurality of gas pressure containers connected to one another is used. Thus, the term “gas pressure container” also includes the embodiment in which a plurality of gas pressure containers connected to one another is used.

If a plurality of gas pressure containers connected to one another is used, the minimum volume indicated above is based on the sum of the individual minimum volumes.

If a plurality of gas pressure containers connected to one another is used, the filter can be present on at least one of the gas pressure containers. The filter can likewise be present on a plurality of gas pressure containers.

The gas pressure container of the invention thus serves for the uptake, storage and delivery of a fuel gas which is suitable for powering a vehicle by combustion of the fuel gas.

The present invention thus further provides for the use of a gas pressure container according to the invention for filling a further gas pressure container which is present in or on a vehicle and comprises an adsorbent for the storage of the fuel gas.

The vehicle can be, for example, a passenger car or a goods vehicle. The volume of the further gas pressure container which is present in or on the vehicle is in the range from 50 to 5001.

A filter can likewise be present in the vehicle which has the further gas pressure container with an adsorbent for the storage of the fuel gas.

The adsorbent used for the storage of the fuel gas can be activated carbon or a porous metal organic framework.

The storage density for the fuel gas in a gas pressure container having an adsorbent should, at 25° C., be at least 50 g/l, preferably at least 80 g/l, for methane-comprising fuel gases and at least 25 g/l, preferably at least 35 g/l, for hydrogen-comprising fuel gases.

It is advantageous for the activated carbon to be in the form of a shaped body and to have a specific surface area of at least 500 $m^2/g$ (Langmuir, $N_2$, 77 K). The specific surface area is more preferably at least 750 $m^2/g$ and very particularly preferably at least 1000 $m^2/g$.

In a particularly preferred embodiment, the adsorbent for the storage of the fuel gas is a porous metal organic framework.

The porous metal organic framework comprises at least one at least bidentate organic compound coordinated to at least one metal ion. This metal organic framework (MOF) is described, for example, in U.S. Pat. No. 5,648,508, EP-A-0 709 253, M. O'Keeffe et al., J. Sol. State Chem., 152 (2000), pages 3 to 20, H. Li et al., Nature 402 (1999), pages 276, M. Eddaoudi et al., Topics in Catalysis 9 (1999), pages 105 to 111, B. Chen et al., Science 291 (2001), pages 1021 to 1023 and DE-A-101 11 230.

The MOFs used according to the present invention comprise pores, in particular micropores or mesopores. Micropores are defined as pores having a diameter of 2 nm or less and mesopores are defined by a diameter in the range from 2 to 50 nm, in each case in accordance with the definition given in Pure Applied Chem. 57 (1985), pages 603-619, in particular on page 606. The presence of micropores and/or mesopores can be checked by means of sorption measurements which determine the uptake capacity of the MOFs for nitrogen at 77 kelvin in accordance with DIN 66131 and/or DIN 66134.

The specific surface area, calculated according to the Langmuir model (DIN 66131, 66134), of a MOF in powder form is preferably greater than 5 $m^2/g$, more preferably greater than 10 $m^2/g$, more preferably greater than 50 $m^2/g$, even more preferably greater than 500 $m^2/g$, even more preferably greater than 1000 $m^2/g$ and particularly preferably greater than 1500 $m^2/g$.

Shaped MOF bodies can have a lower specific surface area, but these specific surface areas are preferably greater than 10 $m^2/g$, more preferably greater than 50 $m^2/g$, even more preferably greater than 500 $m^2/g$ and in particular greater than 1000 $m^2/g$.

The metal component in the framework used according to the present invention is preferably selected from groups Ia, IIa, IIIa, IVa to VIIIa and Ib to VIb. Particular preference is given to Mg, Ca, Sr, Ba, Sc, Y, Ti, Zr, Hf, V, Nb, Ta, Cr, Mo, W, Mn, Re, Fe, Ru, Os, Co, Rh, Ir, Ni, Pd, Pt, Cu, Ag, Au, Zn, Cd, Hg, Al, Ga, In, TI, Si, Ge, Sn, Pb, As, Sb and Bi. Greater preference is given to Zn, Cu, Mg, Al, Ga, In, Sc, Y, Lu, Ti, Zr, V, Fe, Ni and Co. Particular preference is given to Cu, Zn, Al, Fe and Co. With regard to ions of these elements, particular mention may be made of $Mg^{2+}$, $Ca^{2+}$, $Sr^{2+}$, $Ba^{2+}$, $Sc^{3+}$, $Y^{3+}$, $Ti^{4+}$, $Zr^{4+}$, $Hf^{4+}$, $V^{4+}$, $V^{3+}$, $V^{2+}$, $Nb^{3+}$, $Ta^{3+}$, $Cr^{3+}$, $Mo^{3+}$, $W^{3+}$, $Mn^{3+}$, $Mn^{2+}$, $Re^{3+}$, $Re^{2+}$, $Fe^{3+}$, $Fe^{2+}$, $Ru^{3+}$, $Ru^{2+}$, $Os^{3+}$, $Os^{2+}$, $Co^{3+}$, $Co^{2+}$, $Ru^{2+}$, $Rh^{2+}$, $Ir^{2+}$, $Ir^{2+}$, $Nr^{2+}$, $Ni^{+}$, $Pd^{2+}$, $Pd^{+}$, $Pt^{2+}$, $Pt^{+}$, $Cu^{2+}$, $Cu^{+}$, $Ag^{+}$, $Au^{+}$, $Zn^{2+}$, $Cd^{2+}$, $Hg^{2+}$, $Al^{3+}$, $Ga^{3+}$, $In^{3+}$, $Tl^{3+}$, $Si^{4+}$, $Si^{2+}$, $Ge^{4+}$, $Ge^{2+}$, $Sn^{4+}$, $Sn^{2+}$, $Pb^{4+}$, $Pb^{2+}$, $As^{5+}$, $As^{3+}$, $As^{+}$, $Sb^{5+}$, $Sb^{3+}$, $Sb^{+}$, $Bi^{5+}$, $Bi^{3+}$ and $Bi^{+}$.

The term "at least bidentate organic compound" refers to an organic compound which comprises at least one functional group which is able to form at least two, preferably two, coordinate bonds to a given metal ion and/or a coordinate bond to each of two or more, preferably two, metal atoms.

As functional groups via which the coordinate bonds mentioned can be formed, particular mention may be made of, for example, the following functional groups: —$CO_2H$, —$CS_2H$, —$NO_2$, —$B(OH)_2$, —$SO_3H$, —$Si(OH)_3$, —$Ge(OH)_3$, —$Sn(OH)_3$, —$Si(SH)_4$, —$Ge(SH)_4$, —$Sn(SH)_3$, —$PO_3H$, —$AsO_3H$, —$AsO_4H$, —$P(SH)_3$, —$As(SH)_3$, —$CH(RSH)_2$, —$C(RSH)_3$—$CH(RNH_2)_2$—$C(RNH_2)_3$, —$CH(ROH)_2$, —$C(ROH)_3$, —$CH(RCN)_2$, —$C(RCN)_3$, where R is, for example, preferably an alkylene group having 1, 2, 3, 4 or 5 carbon atoms, for example a methylene, ethylene, n-propylene, i-propylene, n-butylene, i-butylene, tert-butylene or n-pentylene group, or an aryl group comprising 1 or 2 aromatic rings, for example 2 $C_6$ rings, which may, if appropriate, be fused and may be independently substituted by at least one substituent in each case and/or may comprise, independently of one another, at least one heteroatom such as N, O and/or S. In likewise preferred embodiments, functional groups in which the abovementioned radical R is not present are possible. Such groups are, inter alia, —$CH(SH)_2$, —$C(SH)_3$, —$CH(NH_2)_2$, —$C(NH_2)_3$, —$CH(OH)_2$, —$C(OH)_3$, —$CH(CN)_2$ or —$C(CN)_3$.

The at least two functional groups can in principle be any suitable organic compound, as long as it is ensured that the organic compound in which these functional groups are present is capable of forming the coordinate bond and for producing the framework.

The organic compounds which comprise at least two functional groups are preferably derived from a saturated or unsaturated aliphatic compound or an aromatic compound or a both aliphatic and aromatic compound.

The aliphatic compound or the aliphatic part of the both aliphatic and aromatic compound can be linear and/or branched and/or cyclic, with a plurality of rings per compound also being possible. More preferably, the aliphatic compound or the aliphatic part of the both aliphatic and aromatic compound comprises from 1 to 15, more preferably from 1 to 14, more preferably from 1 to 13, more preferably from 1 to 12, more preferably from 1 to 11 and particularly preferably from 1 to 10, carbon atoms, for example 1, 2, 3, 4, 5, 6, 7, 8, 9 or 10 carbon atoms. Particular preference is here given to, inter alia, methane, adamantane, acetylene, ethylene or butadiene.

The aromatic compound or the aromatic part of the both aromatic and aliphatic compound can have one or more rings, for example two, three, four or five rings, with the rings being able to be separate from one another and/or at least two rings being able to be present in fused form. The aromatic compound or the aromatic part of the both aliphatic and aromatic compound particularly preferably has one, two or three rings, with one or two rings being particularly preferred. Furthermore, each ring of the specified compound can independently comprise at least one heteroatom such as N, O, S, B, P, Si, Al, preferably N, O and/or S. The aromatic compound or the aromatic part of the both aromatic and aliphatic compound more preferably comprises one or two $C_6$ rings which are present either separately or in fused form. Particular mention may be made of benzene, naphthalene and/or biphenyl and/or bipyridyl and/or pyridyl as aromatic compounds.

The at least bidentate organic compound is particularly preferably derived from a dicarboxylic, tricarboxylic or tetracarboxylic acid or a sulfur analogue thereof. Sulfur analogues are the functional groups —C(=O)SH and its tautomers and C(=S)SH, which can be used in place of one or more carboxylic acid groups.

For the purposes of the present invention, the term "derive" means that the at least bidentate organic compound can be present in partly deprotonated or completely deprotonated form in the framework. Furthermore, the at least bidentate organic compound can comprise further substituents such as —OH, —$NH_2$, —$OCH_3$, —$CH_3$, $NH(CH_3)$, —$N(CH_3)_2$, —CN and halides.

For the purposes of the present invention, mention may be made by way of example of dicarboxylic acids such as oxalic acid, succinic acid, tartaric acid, 1,4-butanedicarboxylic acid, 4-oxopyran-2,6-dicarboxylic acid, 1,6-hexanedicarboxylic acid, decanedicarboxylic acid, 1,8-heptadecanedicarboxylic acid, 1,9-heptadecanedicarboxylic acid, heptadecanedicarboxylic acid, acetylenedicarboxylic acid, 1,2-benzenedicarboxylic acid, 2,3-pyridinedicarboxylic acid, pyridine-2,3-dicarboxylic acid, 1,3-butadiene-1,4-dicarboxylic acid, 1,4-benzenedicarboxylic acid, p-benzenedicarboxylic acid, imidazole-2,4-dicarboxylic acid, 2-methylquinoline-3,4-dicarboxylic acid, quinoline-2,4-dicarboxylic acid, quinoxaline-2,3-dicarboxylic acid, 6-chloroquinoxaline-2,3-dicarboxylic acid, 4,4'-diaminophenylmethane-3,3'-dicarboxylic acid, quinoline-3,4-dicarboxylic acid, 7-chloro-4-hydroxyquinoline-2,8-dicarboxylic acid, diimidecarboxylic acid, pyridine-2,6-dicarboxylic acid, 2-methylimidazole-4,5-dicarboxylic acid, thiophene-3,4-dicarboxylic acid, 2-isopropylimidazole-4,5-dicarboxylic acid, tetrahydropyrane-4,4-dicarboxylic acid, perylene-3,9-dicarboxylic acid, perylenedicarboxylic acid, Pluriol E 200-dicarboxylic acid, 3,6-dioxaoctanedicarboxylic acid, 3,5-cyclohexadiene-1,2-dicarboxylic acid, octa-dicarboxylic acid, pentane-3,3-carboxylic acid, 4,4'-diamino-1,1'-biphenyl-3,3'-dicarboxylic acid, 4,4'-diaminobiphenyl-3,3'-dicarboxylic acid, benzidine-3,3'-dicarboxylic acid, 1,4-bis(phenylamino)benzene-2,5-dicarboxylic acid, 1,1'-binaphthyl-5,5'-dicarboxylic acid, 7-chloro-8-methylquinoline-2,3-dicarboxylic acid, 1-anilinoanthraquinone-2,4'-dicarboxylic acid, polytetrahydrofuran 250-dicarboxylic acid, 1,4-bis(carboxymethyl)piperazine-2,3-dicarboxylic acid, 7-chloroquinoline-3,8-dicarboxylic acid, 1-(4-carboxy)phenyl-3-(4-chloro)phenylpyrazoline-4,5-dicarboxylic acid, 1,4,5,6,7,7-hexachloro-5-norbornene-2,3-dicarboxylic acid, phenylindandicarboxylic acid, 1,3-dibenzyl-2-oxoimidazolidine-4,5-dicarboxylic acid, 1,4-cyclohexanedicarboxylic acid, naphthalene-1,8-dicarboxylic acid, 2,-benzoylbenzene-1,3-dicarboxylic acid, 1,3-dibenzyl-2-oxoimidazolidine-4,5-cis-dicarboxylic acid, 2,2'-biquinoline-4,4'-dicarboxylic acid, pyridine-3,4-dicarboxylic acid, 3,6,9-trioxaundecanedicarboxylic acid, O-hydroxybenzophenonedicarboxylic acid, Pluriol E 300-dicarboxylic acid, Pluriol E 400-dicarboxylic acid, Pluriol E 600-dicarboxylic acid, pyrazole-3,4-dicarboxylic acid, 2,3-pyrazinedicarboxylic acid, 5,6-dimethyl-2,3-pyrazinedicarboxylic acid, 4,4'-diamino(diphenyl ether)diimidedicarboxylic acid, 4,4'-diaminodiphenylmethanediimidedicarboxylic acid, 4,4'-diamino(diphenyl sulfone)diimidedicarboxylic acid, 2,6-naphthalenedicarboxylic acid, 1,3-adamantanedicarboxylic acid, 1,8-naphthalenedicarboxylic acid, 2,3-naphthalenedicarboxylic acid, 8-methoxy-2,3-naphthalenedicarboxylic acid, 8-nitro-2,3-naphthalenecarboxylic acid, 8-sulfo-2,3-naphthalenedicarboxylic acid, anthracene-2,3-dicarboxylic acid, 2',3'-diphenyl-p-terphenyl-4,4"-dicarboxylic acid, (diphenyl ether)-4,4'-dicarboxylic acid, imidazole-4,5-dicarboxylic acid, 4(1H)-oxothiochromene-2,8-dicarboxylic acid, 5-tert-butyl-1,3-benzenedicarboxylic acid, 7,8-quinolinedicarboxylic acid, 4,5-imidazoledicarboxylic acid, 4-cyclohexene-1,2-dicarboxylic acid, hexatriacontanedicarboxylic acid, tetradecanedicarboxylic acid, 1,7-heptadicarboxylic acid, 5-hydroxy-1,3-benzenedicarboxylic acid, pyrazine-2,3-dicarboxylic acid, furan-2,5-dicarboxylic acid, 1-nonene-6,9-dicarboxylic acid, eicosenedicarboxylic acid, 4,4'-dihydroxydiphenylmethane-3,3'-dicarboxylic acid, 1-amino-4-methyl-9,10-dioxo-9,10-dihydroanthracene-2,3-dicarboxylic acid, 2,5-pyridinedicarboxylic acid, cyclohexene-2,3-dicarboxylic acid, 2,9-dichlorofluorubin-4,11-dicarboxylic acid, 7-chloro-3-methylquinoline-6,8-dicarboxylic acid, 2,4-dichlorobenzophenone-2',5'-dicarboxylic acid, 1,3-benzenedicarboxylic acid, 2,6-pyridinedicarboxylic acid, 1-methylpyrrole-3,4-dicarboxylic acid, 1-benzyl-1H-pyrrole-3,4-dicarboxylic acid, anthraquinone-1,5-dicarboxylic acid, 3,5-pyrazoledicarboxylic acid, 2-nitrobenzene-1,4-dicarboxylic acid, heptane-1,7-dicarboxylic acid, cyclobutane-1,1-dicarboxylic acid, 1,14-tetradecanedicarboxylic acid, 5,6-dehydro-norbornane-2,3-dicarboxylic acid or 5-ethyl-2,3-pyridinedicarboxylic acid tricarboxylic acids such as 2-hydroxy-1,2,3-propanetricarboxylic acid, 7-chloro-2,3,8-quinolinetricarboxylic acid, 1,2,4-benzenetricarboxylic acid, 1,2,4-butanetricarboxylic acid, 2-phosphono-1,2,4-butanetricarboxylic acid, 1,3,5-benzenetricarboxylic acid, 1-hydroxy-1,2,3-propanetricarboxylic acid, 4,5-dihydro-4,5-dioxo-1H-pyrrolo[2,3-F]quinoline-2,7,9-tricarboxylic acid, 5-acetyl-3-amino-6-methylbenzene-1,2,4-tricarboxylic acid, 3-amino-5-benzoyl-6-methylbenzene-1,2,4-tricarboxylic acid, 1,2,3-propanetricarboxylic acid or aurintricarboxylic acid, or tetracarboxylic acids such as (perylo[1,12-BCD]thiophene 1,1-dioxide)-3,4,9,10-tetracarboxylic acid, perylenetetra-carboxylic acids such as perylene-3,4,9,10-tetracarboxylic acid or (perylene 1,12-sulfone)-3,4,9,10-tetracarboxylic acid, butanetetracarboxylic acids such as 1,2,3,4-butanetetracarboxylic acid or meso-1,2,3,4-butanetetracarboxylic acid, decane-2,4,6,8-tetracarboxylic acid, 1,4,7,10,13,16-hexaoxacyclooctadecane-2,3,11,12-tetracarboxylic acid, 1,2,4,5-benzenetetracarboxylic acid, 1,2,11,12-dodecanetetracarboxylic acid, 1,2,5,6-hexanetetracarboxylic acid, 1,2,7,8-octanetetracarboxylic acid, 1,4,5,8-naphthalenetetracarboxylic acids 1,2,9,10-decanetetracarboxylic acid, benzophenonetetracarboxylic acid, 3,3'-4,4'-benzophenonetetracarboxylic acid, tetrahydrofurantetracarboxylic acid or cyclopentanetetracarboxylic acids such as cyclopentane-1,2,3,4-tetracarboxylic acid.

Very particular preference is given to unsubstituted or at least monosubstituted aromatic dicarboxylic, tricarboxylic or tetracarboxylic acids having one, two, three, four or more rings, with each of the rings being able to comprise at least one heteroatom and two or more rings being able to comprise identical or different heteroatoms. For example, preference is given to one-ring dicarboxylic acids, one-ring tricarboxylic acids, one-ring tetracarboxylic acids, two-ring dicarboxylic acids, two-ring tricarboxylic acids, two-ring tetracarboxylic acids, three-ring dicarboxylic acids, three-ring tricarboxylic acids, three-ring tetracarboxylic acids, four-ring dicarboxylic acids, four-ring tricarboxylic acids and/or four-ring tetracarboxylic acids. Suitable heteroatoms are, for example, N, O, S, B, P, Si, Al, and preferred heteroatoms are N, S and/or O, Suitable substituents here are, inter alia, —OH, a nitro group, an amino group and an alkyl or alkoxy group.

Particularly preferred at least bidentate organic compounds are acetylenedicarboxylic acid (ADC), benzenedicarboxylic acids, naphthalenedicarboxylic acids, biphenyldicarboxylic acids such as 4,4'-biphenyldicarboxylic acid (BPDC), bipyridinedicarboxylic acids such as 2,2-bipyridinedicarboxylic acids such as 2,2'-bipyridine-5,5'-dicarboxylic acid, benzenetricarboxylic acids such as 1,2,3-benzenetricarboxylic acid or 1,3,5-benzenetricarboxylic acid (BTC), adamantanetetracarboxylic acid (ATC), adamantanedibenzoate (ADB), benzenetribenzoate (BTB), methanetetrabenzoate (MTB), adamanane-tetrabenzoate or dihydroxyterephthalic acids such as 2,5-dihydroxyterephthalate acid (DHBDC).

Very particular preference is given to using, inter alia, isophthalic acid, terephthalic acid, 2,5-dihydroxyterephthalic acid, 1,2,3-benzenetricarboxylic acid, 1,3,5-benzenetricarboxylic acid or 2,2'-bipyridine-5,5'-dicarboxylic acid.

In addition to these at least bidentate organic compounds, the MOF can further comprise one or more monodentate ligands.

Suitable solvents for preparing the MOF are, inter alia, ethanol, dimethylformamide, toluene, methanol, chlorobenzene, diethylformamide, dimethyl sulfoxide, water, hydrogen peroxide, methylamine, aqueous sodium hydroxide solution, N-methylpolidone ether, acetonitrile, benzyl chloride, triethylamine, ethylene glycol and mixtures thereof. Further metal ions, at least bidentate organic compounds and solvents for preparing MOFs are described, inter alia, in U.S. Pat. No. 5,648,508 or DE-A 101 11 230.

The pore size of the MOF can be controlled by selection of the appropriate ligand and/or the at least bidentate organic compound. It is generally the case that the larger the organic compound, the larger the pore size. The pore size is preferably from 0.2 nm to 30 nm, particularly preferably in the range from 0.3 nm to 3 nm, based on the crystalline material.

However, larger pores whose size distribution can vary also occur in a shaped MOF body. Preference is nevertheless given to more than 50% of the total pore volume, in particular more than 75%, being made up by pores having a pore diameter of up to 1000 mm. However, preference is given to a major part of the pore volume being made up by pores having two diameter ranges. It is therefore preferred for more than 25% of the total pore volume, in particular more than 50% of the total pore volume, to be made up by pores which have a diameter in the range from 100 nm to 800 nm and more than 15% of the total pore volume, in particular more than 25% of the total pore volume, to be made up by pores which have a diameter up to 10 nm. The pore distribution can be determined by means of mercury porosimetry.

Examples of MOFs are given below. In addition to the designation of the MOF, the metal and the at least bidentate ligand, the solvent and the cell parameters (angles α, β and γ and the dimensions A, B and C in Å) are indicated. The latter were determined by X-ray diffraction.

| MOF-n | Constituents Molar ratio M + L | Solvents | α | β | γ | a | b | c | Space group |
|---|---|---|---|---|---|---|---|---|---|
| MOF-0 | $Zn(NO_3)_2 \cdot 6H_2O$ $H_3$(BTC) | ethanol | 90 | 90 | 120 | 16.711 | 16.711 | 14.189 | P6(3)/ Mcm |
| MOF-2 | $Zn(NO_3)_2 \cdot 6H_2O$ (0.246 mmol) $H_2$(BDC) 0.241 mmol) | DMF toluene | 90 | 102.8 | 90 | 6.718 | 15.49 | 12.43 | P2(1)/n |

-continued

| MOF-n | Constituents Molar ratio M + L | Solvents | α | β | γ | a | b | c | Space group |
|---|---|---|---|---|---|---|---|---|---|
| MOF-3 | $Zn(NO_3)_2$•$6H_2O$ (1.89 mmol) $H_3(BDC)$ (1.93 mmol) | DMF MeOH | 99.72 | 111.11 | 108.4 | 9.726 | 9.911 | 10.45 | P-1 |
| MOF-4 | $Zn(NO_3)_2$•$6H_2O$ (1.00 mmol) $H_3(BTC)$ (0.5 mmol) | ethanol | 90 | 90 | 90 | 14.728 | 14.728 | 14.728 | P2(1)3 |
| MOF-5 | $Zn(NO_3)_2$•$6H_2O$ (2.22 mmol) $H_2(BDC)$ (2.17 mmol) | DMF chloro-benzene | 90 | 90 | 90 | 25.669 | 25.669 | 25.669 | Fm-3m |
| MOF-38 | $Zn(NO_3)_2$•$6H_2O$ (0.27 mmol) $H_3(BTC)$ (0.15 mmol) | DMF chloro-benzene | 90 | 90 | 90 | 20.657 | 20.657 | 17.84 | I4cm |
| MOF-31 $Zn(ADC)_2$ | $Zn(NO_3)_2$•$6H_2O$ 0.4 mmol $H_2(ADC)$ 0.8 mmol | ethanol | 90 | 90 | 90 | 10.821 | 10.821 | 10.821 | Pn(−3)m |
| MOF-12 $Zn_2(ATC)$ | $Zn(NO_3)_2$•$6H_2O$ 0.3 mmol $H_4(ATC)$ 0.15 mmol | ethanol | 90 | 90 | 90 | 15.745 | 16.907 | 18.167 | Pbca |
| MOF-20 ZnNDC | $Zn(NO_3)_2$•$6H_2O$ 0.37 mmol $H_2NDC$ 0.36 mmol | DMF chloro-benzene | 90 | 92.13 | 90 | 8.13 | 16.444 | 12.807 | P2(1)/c |
| MOF-37 | $Zn(NO_3)_2$•$6H_2O$ 0.2 mmol $H_2NDC$ 0.2 mmol | DMF chloro-benzene | 72.38 | 83.16 | 84.33 | 9.952 | 11.576 | 15.556 | P-1 |
| MOF-8 $Tb_2(ADC)$ | $Tb(NO_3)_3$•$5H_2O$ 0.10 mmol $H_2ADC$ 0.20 mmol | DMSO MeOH | 90 | 115.7 | 90 | 19.83 | 9.822 | 19.183 | C2/c |
| MOF-9 $Tb_2(ADC)$ | $Tb(NO_3)_3$•$5H_2O$ 0.08 mmol $H_2ADB$ 0.12 mmol | DMSO | 90 | 102.09 | 90 | 27.056 | 16.795 | 28.139 | C2/c |
| MOF-6 | $Tb(NO_3)_3$•$5H_2O$ 0.30 mmol $H_2(BDC)$ 0.30 mmol | DMF MeOH | 90 | 91.28 | 90 | 17.599 | 19.996 | 10.545 | P21/c |
| MOF-7 | $Tb(NO_3)_3$•$5H_2O$ 0.15 mmol $H_2(BDC)$ 0.15 mmol | $H_2O$ | 102.3 | 91.12 | 101.5 | 6.142 | 10.069 | 10.096 | P-1 |
| MOF-69A | $Zn(NO_3)_2$•$6H_2O$ 0.083 mmol 4,4'BPDC 0.041 mmol | DEF $H_2O_2$ $MeNH_2$ | 90 | 111.6 | 90 | 23.12 | 20.92 | 12 | C2/c |
| MOF-69B | $Zn(NO_3)_2$•$6H_2O$ 0.083 mmol 2,6-NCD 0.041 mmol | DEF $H_2O_2$ $MeNH_2$ | 90 | 95.3 | 90 | 20.17 | 18.55 | 12.16 | C2/c |
| MOF-11 $Cu_2(ATC)$ | $Cu(NO_3)_2$•$2.5H_2O$ 0.47 mmol $H_2ATC$ 0.22 mmol | $H_2O$ | 90 | 93.86 | 90 | 12.987 | 11.22 | 11.336 | C2/c |
| MOF-11 $Cu_2(ATC)$ dehydr. | | | 90 | 90 | 90 | 8.4671 | 8.4671 | 14.44 | P42/mmc |
| MOF-14 $Cu_3$ (BTB) | $Cu(NO_3)_2$•$2.5H_2O$ 0.28 mmol $H_3BTB$ 0.052 mmol | $H_2O$ DMF EtOH | 90 | 90 | 90 | 26.946 | 26.946 | 26.946 | Im-3 |
| MOF-32 Cd(ATC) | $Cd(NO_3)_2$•$4H_2O$ 0.24 mmol $H_4ATC$ 0.10 mmol | $H_2O$ NaOH | 90 | 90 | 90 | 13.468 | 13.468 | 13.468 | P(−4)3m |
| MOF-33 $Zn_2$ (ATB) | $ZnCl_2$ 0.15 mmol $H_4ATB$ 0.02 mmol | $H_2O$ DMF EtOH | 90 | 90 | 90 | 19.561 | 15.255 | 23.404 | Imma |

-continued

| MOF-n | Constituents Molar ratio M + L | Solvents | α | β | γ | a | b | c | Space group |
|---|---|---|---|---|---|---|---|---|---|
| MOF-34 Ni(ATC) | $Ni(NO_3)_2$•$6H_2O$ 0.24 mmol $H_4ATC$ 0.10 mmol | $H_2O$ NaOH | 90 | 90 | 90 | 10.066 | 11.163 | 19.201 | $P2_12_12_1$ |
| MOF-36 $Zn_2$ (MTB) | $Zn(NO_3)_2$•$4H_2O$ 0.20 mmol $H_4MTB$ 0.04 mmol | $H_2O$ DMF | 90 | 90 | 90 | 15.745 | 16.907 | 18.167 | Pbca |
| MOF-39 $Zn_3O$(HBTB) | $Zn(NO_3)_2$ $4H_2O$ 0.27 mmol $H_3BTB$ 0.07 mmol | $H_2O$ DMF EtOH | 90 | 90 | 90 | 17.158 | 21.591 | 25.308 | Pnma |
| NO305 | $FeCl_2$•$4H_2O$ 5.03 mmol formic acid 86.90 mmol | DMF | 90 | 90 | 120 | 8.2692 | 8.2692 | 63.566 | R-3c |
| NO306A | $FeCl_2$•$4H_2O$ 5.03 mmol formic acid 86.90 mmol | DEF | 90 | 90 | 90 | 9.9364 | 18.374 | 18.374 | Pbcn |
| NO29 MOF-0 similar | $Mn(Ac)_2$•$4H_2O$ 0.46 mmol $H_3BTC$ 0.69 mmol | DMF | 120 | 90 | 90 | 14.16 | 33.521 | 33.521 | P-1 |
| BPR48 A2 | $Zn(NO_3)_2$ $6H_2O$ 0.012 mmol $H_2BDC$ 0.012 mmol | DMSO toluene | 90 | 90 | 90 | 14.5 | 17.04 | 18.02 | Pbca |
| BPR69 B1 | $Cd(NO_3)_2$ $4H_2O$ 0.0212 mmol $H_2BDC$ 0.0428 mmol | DMSO | 90 | 98.76 | 90 | 14.16 | 15.72 | 17.66 | Cc |
| BPR92 A2 | $Co(NO_3)_2$•$6H_2O$ 0.018 mmol $H_2BDC$ 0.018 mmol | NMP | 106.3 | 107.63 | 107.2 | 7.5308 | 10.942 | 11.025 | P1 |
| BPR95 C5 | $Cd(NO_3)_2$ $4H_2O$ 0.012 mmol $H_2BDC$ 0.36 mmol | NMP | 90 | 112.8 | 90 | 14.460 | 11.085 | 15.829 | P2(1)/n |
| Cu $C_6H_4O_6$ | $Cu(NO_3)_2$•$2.5H_2O$ 0.370 mmol $H_2BDC(OH)_2$ 0.37 mmol | DMF chloro-benzene | 90 | 105.29 | 90 | 15.259 | 14.816 | 14.13 | P2(1)/c |
| M(BTC) MOF-0 similar | $Co(SO_4)$ $H_2O$ 0.055 mmol $H_3BTC$ 0.037 mmol | DMF | | as for MOF-0 | | | | | |
| $Tb(C_6H_4O_6)$ | $Tb(NO_3)_3$•$5H_2O$ 0.370 mmol $H_2(C_6H_4O_6)$ 0.56 mmol | DMF chloro-benzene | 104.6 | 107.9 | 97.147 | 10.491 | 10.981 | 12.541 | P-1 |
| Zn $(C_2O_4)$ | $ZnCl_2$ 0.370 mmol oxalic acid 0.37 mmol | DMF chloro-benzene | 90 | 120 | 90 | 9.4168 | 9.4168 | 8.464 | P(−3)1m |
| Co(CHO) | $Co(NO_3)_2$•$5H_2O$ 0.043 mmol formic acid 1.60 mmol | DMF | 90 | 91.32 | 90 | 11.328 | 10.049 | 14.854 | P2(1)/n |
| Cd(CHO) | $Cd(NO_3)_2$•$4H_2O$ 0.185 mmol formic acid 0.185 mmol | DMF | 90 | 120 | 90 | 8.5168 | 8.5168 | 22.674 | R-3c |
| $Cu(C_3H_2O_4)$ | $Cu(NO_3)_2$•$2.5H_2O$ 0.043 mmol malonic acid 0.192 mmol | DMF | 90 | 90 | 90 | 8.366 | 8.366 | 11.919 | P43 |
| $Zn_6$ $(NDC)_5$ MOF-48 | $Zn(NO_3)_2$•$6H_2O$ 0.097 mmol 14 NDC 0.069 mmol | DMF chloro-benzene $H_2O_2$ | 90 | 95.902 | 90 | 19.504 | 16.482 | 14.64 | C2/m |
| MOF-47 | Zn(NO3)2 6H2O 0.185 mmol $H_2$(BDC[CH3]4) 0.185 mmol | DMF chloro-benzene H2O2 | 90 | 92.55 | 90 | 11.303 | 16.029 | 17.535 | P2(1)/c |

-continued

| MOF-n | Constituents Molar ratio M + L | Solvents | α | β | γ | a | b | c | Space group |
|---|---|---|---|---|---|---|---|---|---|
| MO25 | $Cu(NO_3)_2$•2.5H2O 0.084 mmol BPhDC 0.085 mmol | DMF | 90 | 112.0 | 90 | 23.880 | 16.834 | 18.389 | P2(1)/c |
| Cu-Thio | Cu(NO3)2•2.5H2O 0.084 mmol thiophene-dicarboxylic acid 0.085 mmol | DEF | 90 | 113.6 | 90 | 15.4747 | 14.514 | 14.032 | P2(1)/c |
| ClBDC1 | $Cu(NO_3)$2•2.5H2O 0.084 mmol H2(BDCCl2) 0.085 mmol | DMF | 90 | 105.6 | 90 | 14.911 | 15.622 | 18.413 | C2/c |
| MOF-101 | $Cu(NO_3)$2•2.5H2O 0.084 mmol BrBDC 0.085 mmol | DMF | 90 | 90 | 90 | 21.607 | 20.607 | 20.073 | Fm3m |
| Zn3(BTC)2 | ZnCl2 0.033 mmol H3BTC 0.033 mmol | DMF EtOH base added | 90 | 90 | 90 | 26.572 | 26.572 | 26.572 | Fm-3m |
| MOF-j | Co(CH3CO2)2•4H2O (1.65 mmol) H3(BZC) (0.95 mmol) | H2O | 90 | 112.0 | 90 | 17.482 | 12.963 | 6.559 | C2 |
| MOF-n | Zn(NO3)2•6H2O H3 (BTC) | ethanol | 90 | 90 | 120 | 16.711 | 16.711 | 14.189 | P6(3)/mcm |
| PbBDC | Pb(NO3)2 (0.181 mmol) H2(BDC) (0.181 mmol) | DMF ethanol | 90 | 102.7 | 90 | 8.3639 | 17.991 | 9.9617 | P2(1)/n |
| Znhex | Zn(NO3)2•6H2O (0.171 mmol) H3BTB (0.114 mmol) | DMF p-xylene ethanol | 90 | 90 | 120 | 37.1165 | 37.117 | 30.019 | P3(1)c |
| AS16 | FeBr2 0.927 mmol H2(BDC) 0.927 mmol | DMF anhydr. | 90 | 90.13 | 90 | 7.2595 | 8.7894 | 19.484 | P2(1)c |
| AS27-2 | FeBr2 0.927 mmol H3(BDC) 0.464 mmol | DMF anhydr. | 90 | 90 | 90 | 26.735 | 26.735 | 26.735 | Fm3m |
| AS32 | FeCl3 1.23 mmol H2(BDC) 1.23 mmol | DMF anhydr. ethanol | 90 | 90 | 120 | 12.535 | 12.535 | 18.479 | P6(2)c |
| AS54-3 | FeBr2 0.927 BPDC 0.927 mmol | DMF anhydr. n-propanol | 90 | 109.98 | 90 | 12.019 | 15.286 | 14.399 | C2 |
| AS61-4 | FeBr2 0.927 mmol m-BDC 0.927 mmol | pyridine anhydr. | 90 | 90 | 120 | 13.017 | 13.017 | 14.896 | P6(2)c |
| AS68-7 | FeBr2 0.927 mmol m-BDC 1.204 mmol | DMF anhydr. pyridine | 90 | 90 | 90 | 18.3407 | 10.036 | 18.039 | Pca21 |
| Zn(ADC) | Zn(NO3)2•6H2O 0.37 mmol H2(ADC) 0.36 mmol | DMF chloro-benzene | 90 | 99.85 | 90 | 16.764 | 9.349 | 9.635 | C2/c |
| MOF-12 $Zn_2$ (ATC) | $Zn(NO_3)_2$•$6H_2O$ 0.30 mmol $H_4$(ATC) 0.15 mmol | ethanol | 90 | 90 | 90 | 15.745 | 16.907 | 18.167 | Pbca |
| MOF-20 ZnNDC | $Zn(NO_3)_2$•$6H_2O$ 0.37 mmol $H_2$NDC 0.36 mmol | DMF chloro-benzene | 90 | 92.13 | 90 | 8.13 | 16.444 | 12.807 | P2(1)/c |
| MOF-37 | $Zn(NO_3)_2$•$6H_2O$ 0.20 mmol $H_2$NDC 0.20 mmol | DMF chloro-benzene | 72.38 | 83.16 | 84.33 | 9.952 | 11.576 | 15.556 | P-1 |

-continued

| MOF-n | Constituents Molar ratio M + L | Solvents | α | β | γ | a | b | c | Space group |
|---|---|---|---|---|---|---|---|---|---|
| Zn(NDC) (DMSO) | $Zn(NO_3)_2$•$6H_2O$ $H_2NDC$ | DMSO | 68.08 | 75.33 | 88.31 | 8.631 | 10.207 | 13.114 | P-1 |
| Zn(NDC) | $Zn(NO_3)_2$•$6H_2O$ $H_2NDC$ | | 90 | 99.2 | 90 | 19.289 | 17.628 | 15.052 | C2/c |
| Zn(HPDC) | $Zn(NO_3)_2$•$4H_2O$ 0.23 mmol $H_2$(HPDC) 0.05 mmol | DMF $H_2O$ | 107.9 | 105.06 | 94.4 | 8.326 | 12.085 | 13.767 | P-1 |
| Co(HPDC) | $Co(NO_3)_2$•$6H_2O$ 0.21 mmol $H_2$ (HPDC) 0.06 mmol | DMF $H_2O$/ ethanol | 90 | 97.69 | 90 | 29.677 | 9.63 | 7.981 | C2/c |
| $Zn_3$(PDC)2.5 | $Zn(NO_3)_2$•$4H_2O$ 0.17 mmol $H_2$(HPDC) 0.05 mmol | DMF/ CIBz $H_20$/ TEA | 79.34 | 80.8 | 85.83 | 8.564 | 14.046 | 26.428 | P-1 |
| $Cd_2$ (TPDC)2 | $Cd(NO_3)_2$•$4H_2O$ 0.06 mmol $H_2$(HPDC) 0.06 mmol | methanol/ CHP $H_2O$ | 70.59 | 72.75 | 87.14 | 10.102 | 14.412 | 14.964 | P-1 |
| Tb(PDC)1.5 | $Tb(NO_3)_3$•$5H_2O$ 0.21 mmol $H_2$(PDC) 0.034 mmol | DMF $H_2O$/ ethanol | 109.8 | 103.61 | 100.14 | 9.829 | 12.11 | 14.628 | P-1 |
| ZnDBP | $Zn(NO_3)_2$•$6H_2O$ 0.05 mmol dibenzyl phosphate 0.10 mmol | MeOH | 90 | 93.67 | 90 | 9.254 | 10.762 | 27.93 | P2/n |
| $Zn_3$(BPDC) | $ZnBr_2$ 0.021 mmol 4,4'BPDC 0.005 mmol | DMF | 90 | 102.76 | 90 | 11.49 | 14.79 | 19.18 | P21/n |
| CdBDC | $Cd(NO_3)_2$•$4H_2O$ 0.100 mmol $H_2$(BDC) 0.401 mmol | DMF $Na_2SiO_3$ (aq) | 90 | 95.85 | 90 | 11.2 | 11.11 | 16.71 | P21/n |
| Cd-mBDC | $Cd(NO_3)_2$•$4H_2O$ 0.009 mmol $H_2$(mBDC) 0.018 mmol | DMF $MeNH_2$ | 90 | 101.1 | 90 | 13.69 | 18.25 | 14.91 | C2/c |
| $Zn_4$OBNDC | $Zn(NO_3)_2$•$6H_2O$ 0.041 mmol BNDC | DEF $MeNH_2$ $H_2O_2$ | 90 | 90 | 90 | 22.35 | 26.05 | 59.56 | Fmmm |
| Eu(TCA) | $Eu(NO_3)_3$•$6H_2O$ 0.14 mmol TCA 0.026 mmol | DMF chloro-benzene | 90 | 90 | 90 | 23.325 | 23.325 | 23.325 | Pm-3n |
| Tb(TCA) | $Tb(NO_3)_3$•$6H_2O$ 0.069 mmol TCA 0.026 mmol | DMF chloro-benzene | 90 | 90 | 90 | 23.272 | 23.272 | 23.372 | Pm-3n |
| Formates | $Ce(NO_3)_3$•$6H_2O$ 0.138 mmol formic acid 0.43 mmol | $H_2O$ ethanol | 90 | 90 | 120 | 10.668 | 10.667 | 4.107 | R-3m |
| | $FeCl_2$•$4H_2O$ 5.03 mmol formic acid 86.90 mmol | DMF | 90 | 90 | 120 | 8.2692 | 8.2692 | 63.566 | R-3c |
| | $FeCl_2$•$4H_2O$ 5.03 mmol formic acid 86.90 mmol | DEF | 90 | 90 | 90 | 9.9364 | 18.374 | 18.374 | Pbcn |
| | $FeCl_2$•$4H_2O$ 5.03 mmol formic acid 86.90 mmol | DEF | 90 | 90 | 90 | 8.335 | 8.335 | 13.34 | P-31c |
| NO330 | $FeCl_2$•$4H_2O$ 0.50 mmol formic acid 8.69 mmol | formamide | 90 | 90 | 90 | 8.7749 | 11.655 | 8.3297 | Pnna |
| NO332 | $FeCl_2$•$4H_2O$ 0.50 mmol formic acid 8.69 mmol | DIP | 90 | 90 | 90 | 10.031 | 18.808 | 18.355 | Pbcn |

-continued

| MOF-n | Constituents Molar ratio M + L | Solvents | α | β | γ | a | b | c | Space group |
|---|---|---|---|---|---|---|---|---|---|
| NO333 | $FeCl_2$•$4H_2O$ 0.50 mmol formic acid 8.69 mmol | DBF | 90 | 90 | 90 | 45.2754 | 23.861 | 12.441 | Cmcm |
| NO335 | $FeCl_2$•$4H_2O$ 0.50 mmol formic acid 8.69 mmol | CHF | 90 | 91.372 | 90 | 11.5964 | 10.187 | 14.945 | P21/n |
| NO336 | $FeCl_2$•$4H_2O$ 0.50 mmol formic acid 8.69 mmol | MFA | 90 | 90 | 90 | 11.7945 | 48.843 | 8.4136 | Pbcm |
| NO13 | $Mn(Ac)_2$•$4H_2O$ 0.46 mmol benzoic acid 0.92 mmol bipyridine 0.46 mmol | ethanol | 90 | 90 | 90 | 18.66 | 11.762 | 9.418 | Pbcn |
| NO29 MOF-0 | $Mn(Ac)_2$•$4H_2O$ 0.46 mmol $H_3BTC$ 0.69 mmol | DMF | 120 | 90 | 90 | 14.16 | 33.521 | 33.521 | P-1 |
| $Mn(hfac)_2$ $(O_2CC_6H_5)$ | $Mn(Ac)_2$•$4H_2O$ 0.46 mmol Hfac 0.92 mmol bipyridine 0.46 mmol | Ether | 90 | 95.32 | 90 | 9.572 | 17.162 | 14.041 | C2/c |
| BPR43G2 | $Zn(NO_3)_2$•$6H_2O$ 0.0288 mmol $H_2BDC$ 0.0072 mmol | DMF $CH_3CN$ | 90 | 91.37 | 90 | 17.96 | 6.38 | 7.19 | C2/c |
| BPR48A2 | $Zn(NO_3)_2$ $6H_2O$ 0.012 mmol $H_2BDC$ 0.012 mmol | DMSO toluene | 90 | 90 | 90 | 14.5 | 17.04 | 18.02 | Pbca |
| BPR49B1 | $Zn(NO_3)_2$ $6H_2O$ 0.024 mmol $H_2BDC$ 0.048 mmol | DMSO methanol | 90 | 91.172 | 90 | 33.181 | 9.824 | 17.884 | C2/c |
| BPR56E1 | $Zn(NO_3)_2$ $6H_2O$ 0.012 mmol $H_2BDC$ 0.024 mmol | DMSO n-propanol | 90 | 90.096 | 90 | 14.5873 | 14.153 | 17.183 | P2(1)/n |
| BPR68D10 | $Zn(NO_3)_2$ $6H_2O$ 0.0016 mmol $H_3BTC$ 0.0064 mmol | DMSO benzene | 90 | 95.316 | 90 | 10.0627 | 10.17 | 16.413 | P2(1)/c |
| BPR69B1 | $Cd(NO_3)_2$ $4H_2O$ 0.0212 mmol $H_2BDC$ 0.0428 mmol | DMSO | 90 | 98.76 | 90 | 14.16 | 15.72 | 17.66 | Cc |
| BPR73E4 | Cd(NO3)2 4H2O 0.006 mmol H2BDC 0.003 mmol | DMSO toluene | 90 | 92.324 | 90 | 8.7231 | 7.0568 | 18.438 | P2(1)/n |
| BPR76D5 | Zn(NO3)2 6H2O 0.0009 mmol H2BzPDC 0.0036 mmol | DMSO | 90 | 104.17 | 90 | 14.4191 | 6.2599 | 7.0611 | Pc |
| BPR80B5 | Cd(NO3)2•4H2O 0.018 mmol H2BDC 0.036 mmol | DMF | 90 | 115.11 | 90 | 28.049 | 9.184 | 17.837 | C2/c |
| BPR80H5 | Cd(NO3)2 4H2O 0.027 mmol H2BDC 0.027 mmol | DMF | 90 | 119.06 | 90 | 11.4746 | 6.2151 | 17.268 | P2/c |
| BPR82C6 | Cd(NO3)2 4H2O 0.0068 mmol H2BDC 0.202 mmol | DMF | 90 | 90 | 90 | 9.7721 | 21.142 | 27.77 | Fdd2 |
| BPR86C3 | Co(NO3)2 6H2O 0.0025 mmol H2BDC 0.075 mmol | DMF | 90 | 90 | 90 | 18.3449 | 10.031 | 17.983 | Pca2(1) |

-continued

| MOF-n | Constituents Molar ratio M + L | Solvents | α | β | γ | a | b | c | Space group |
|---|---|---|---|---|---|---|---|---|---|
| BPR86H6 | Cd(NO3)2•6H2O 0.010 mmol H2BDC 0.010 mmol | DMF | 80.98 | 89.69 | 83.412 | 9.8752 | 10.263 | 15.362 | P-1 |
| | Co(NO3)2 6H2O | NMP | 106.3 | 107.63 | 107.2 | 7.5308 | 10.942 | 11.025 | P1 |
| BPR95A2 | Zn(NO3)2 6H2O 0.012 mmol H2BDC 0.012 mmol | NMP | 90 | 102.9 | 90 | 7.4502 | 13.767 | 12.713 | P2(1)/c |
| CuC6F4O4 | Cu(NO3)2•2.5H2O 0.370 mmol H2BDC(OH)2 0.37 mmol | DMF chloro-benzene | 90 | 98.834 | 90 | 10.9675 | 24.43 | 22.553 | P2(1)/n |
| Fe Formic | FeCl2•4H2O 0.370 mmol formic acid 0.37 mmol | DMF | 90 | 91.543 | 90 | 11.495 | 9.963 | 14.48 | P2(1)/n |
| Mg Formic | Mg(NO3)2•6H2O 0.370 mmol formic acid 0.37 mmol | DMF | 90 | 91.359 | 90 | 11.383 | 9.932 | 14.656 | P2(1)/n |
| MgC6H4O6 | Mg(NO3)2•6H2O 0.370 mmol H2BDC(OH)2 0.37 mmol | DMF | 90 | 96.624 | 90 | 17.245 | 9.943 | 9.273 | C2/c |
| ZnC2H4BDC MOF-38 | ZnCl2 0.44 mmol CBBDC 0.261 mmol | DMF | 90 | 94.714 | 90 | 7.3386 | 16.834 | 12.52 | P2(1)/n |
| MOF-49 | ZnCl2 0.44 mmol m-BDC 0.261 mmol | DMF CH3CN | 90 | 93.459 | 90 | 13.509 | 11.984 | 27.039 | P2/c |
| MOF-26 | Cu(NO3)2•5H2O 0.084 mmol DCPE 0.085 mmol | DMF | 90 | 95.607 | 90 | 20.8797 | 16.017 | 26.176 | P2(1)/n |
| MOF-112 | Cu(NO3)2•2.5H2O 0.084 mmol o-Br-m-BDC 0.085 mmol | DMF ethanol | 90 | 107.49 | 90 | 29.3241 | 21.297 | 18.069 | C2/c |
| MOF-109 | Cu(NO3)2•2.5H2O 0.084 mmol KDB 0.085 mmol | DMF | 90 | 111.98 | 90 | 23.8801 | 16.834 | 18.389 | P2(1)/c |
| MOF-111 | Cu(NO3)2•2.5H2O 0.084 mmol o-BrBDC 0.085 mmol | DMF ethanol | 90 | 102.16 | 90 | 10.6767 | 18.781 | 21.052 | C2/c |
| MOF-110 | Cu(NO3)2•2.5H2O 0.084 mmol thiophene-dicarboxylic acid 0.085 mmol | DMF | 90 | 90 | 120 | 20.0652 | 20.065 | 20.747 | R-3/m |
| MOF-107 | Cu(NO3)2•2.5H2O 0.084 mmol thiophene-dicarboxylic acid 0.085 mmol | DEF | 104.8 | 97.075 | 95.206 | 11.032 | 18.067 | 18.452 | P-1 |
| MOF-108 | Cu(NO3)2•2.5H2O 0.084 mmol thiophene-dicarboxylic acid 0.085 mmol | DBF/ methanol | 90 | 113.63 | 90 | 15.4747 | 14.514 | 14.032 | C2/c |
| MOF-102 | Cu(NO3)2•2.5H2O 0.084 mmol H2(BDCCl2) 0.085 mmol | DMF | 91.63 | 106.24 | 112.01 | 9.3845 | 10.794 | 10.831 | P-1 |
| Clbdc1 | Cu(NO3)2•2.5H2O 0.084 mmol H2(BDCCl2) 0.085 mmol | DEF | 90 | 105.56 | 90 | 14.911 | 15.622 | 18.413 | P-1 |
| Cu(NMOP) | Cu(NO3)2•2.5H2O 0.084 mmol NBDC 0.085 mmol | DMF | 90 | 102.37 | 90 | 14.9238 | 18.727 | 15.529 | P2(1)/m |

-continued

| MOF-n | Constituents Molar ratio M + L | Solvents | α | β | γ | a | b | c | Space group |
|---|---|---|---|---|---|---|---|---|---|
| Tb(BTC) | Tb(NO3)3•5H2O 0.033 mmol H3BTC 0.033 mmol | DMF | 90 | 106.02 | 90 | 18.6986 | 11.368 | 19.721 | |
| Zn3(BTC)2 | ZnCl2 0.033 mmol H3BTC 0.033 mmol | DMF ethanol | 90 | 90 | 90 | 26.572 | 26.572 | 26.572 | Fm-3m |
| Zn4O(NDC) | Zn(NO3)2•4H2O 0.066 mmol 14NDC 0.066 mmol | DMF ethanol | 90 | 90 | 90 | 41.5594 | 18.818 | 17.574 | aba2 |
| CdTDC | Cd(NO3)2•4H2O 0.014 mmol thiophene 0.040 mmol DABCO 0.020 mmol | DMF H2O | 90 | 90 | 90 | 12.173 | 10.485 | 7.33 | Pmma |
| IRMOF-2 | Zn(NO3)2•4H2O 0.160 mmol o-Br-BDC 0.60 mmol | DEF | 90 | 90 | 90 | 25.772 | 25.772 | 25.772 | Fm-3m |
| IRMOF-3 | Zn(NO3)2•4H2O 0.20 mmol H2N-BDC 0.60 mmol | DEF ethanol | 90 | 90 | 90 | 25.747 | 25.747 | 25.747 | Fm-3m |
| IRMOF-4 | $Zn(NO_3)_2$•$4H_2O$ 0.11 mmol $[C_3H_7O]_2$-BDC 0.48 mmol | DEF | 90 | 90 | 90 | 25.849 | 25.849 | 25.849 | Fm-3m |
| IRMOF-5 | $Zn(NO_3)_2$•$4H_2O$ 0.13 mmol $[C_5H_{11}O]_2$-BDC 0.50 mmol | DEF | 90 | 90 | 90 | 12.882 | 12.882 | 12.882 | Pm-3m |
| IRMOF-6 | $Zn(NO_3)_2$•$4H_2O$ 0.20 mmol $[C_2H_4]$-BDC 0.60 mmol | DEF | 90 | 90 | 90 | 25.842 | 25.842 | 25.842 | Fm-3m |
| IRMOF-7 | $Zn(NO_3)_2$•$4H_2O$ 0.07 mmol 1,4NDC 0.20 mmol | DEF | 90 | 90 | 90 | 12.914 | 12.914 | 12.914 | Pm-3m |
| IRMOF-8 | $Zn(NO_3)_2$•$4H_2O$ 0.55 mmol 2,6NDC 0.42 mmol | DEF | 90 | 90 | 90 | 30.092 | 30.092 | 30.092 | Fm-3m |
| IRMOF-9 | $Zn(NO_3)_2$•$4H_2O$ 0.05 mmol BPDC 0.42 mmol | DEF | 90 | 90 | 90 | 17.147 | 23.322 | 25.255 | Pnnm |
| IRMOF-10 | $Zn(NO_3)_2$•$4H_2O$ 0.02 mmol BPDC 0.012 mmol | DEF | 90 | 90 | 90 | 34.281 | 34.281 | 34.281 | Fm-3m |
| IRMOF-11 | $Zn(NO_3)_2$•$4H_2O$ 0.05 mmol HPDC 0.20 mmol | DEF | 90 | 90 | 90 | 24.822 | 24.822 | 56.734 | R-3m |
| IRMOF-12 | $Zn(NO_3)_2$•$4H_2O$ 0.017 mmol HPDC 0.12 mmol | DEF | 90 | 90 | 90 | 34.281 | 34.281 | 34.281 | Fm-3m |
| IRMOF-13 | $Zn(NO_3)_2$•$4H_2O$ 0.048 mmol PDC 0.31 mmol | DEF | 90 | 90 | 90 | 24.822 | 24.822 | 56.734 | R-3m |
| IRMOF-14 | $Zn(NO_3)_2$•$4H_2O$ 0.17 mmol PDC 0.12 mmol | DEF | 90 | 90 | 90 | 34.381 | 34.381 | 34.381 | Fm-3m |
| IRMOF-15 | $Zn(NO_3)_2$•$4H_2O$ 0.063 mmol TPDC 0.025 mmol | DEF | 90 | 90 | 90 | 21.459 | 21.459 | 21.459 | Im-3m |

-continued

| MOF-n | Constituents Molar ratio M + L | Solvents | α | β | γ | a | b | c | Space group |
|---|---|---|---|---|---|---|---|---|---|
| IRMOF-16 | $Zn(NO_3)_2$•$4H_2O$ 0.0126 mmol TPDC 0.05 mmol | DEF NMP | 90 | 90 | 90 | 21.49 | 21.49 | 21.49 | Pm-3m |

ADC Acetylenedicarboxylic acid
NDC Napthalenedicarboxylic acid
BDC Benzenedicarboxylic acid
ATC Adamantanetetracarboxylic acid
BTC Benzenetricarboxylic acid
BTB Benzentribenzoic acid
MTB Methanetetrabenzoic acid
ATB Adamantanetetrabenzoic acid
ADB Adamantanedibenzoic acid Further metal organic frameworks are MOF-2 to 4, MOF-9, MOF-31 to 36, MOF-39, MOF-69 to 80, MOF 103 to 106, MOF-122, MOF-125, MOF-150, MOF-177, MOF-178, MOF-235, MOF-236, MOF-500, MOF-501, MOF-502, MOF-505, IRMOF-1, IRMOF-61, IRMOP-13, IRMOP-51, MIL-17, MIL-45, MIL-47, MIL-53, MIL-59, MIL-60, MIL-61, MIL-63, MIL-68, MIL-79, MIL-80, MIL-83, MIL-85, CPL-1 to 2, SZL-1, which are described in the literature.

Particular preference is given to a porous metal organic framework in which Zn, Al or Cu are present as metal ion and the at least bidentate organic compound is terephthalic acid, isophthalic acid, 2,6-naphthalenedicarboxylic acid or 1,3,5-benzenetricarboxylic acid.

Apart from the conventional method of preparing MOFs, as described, for example in U.S. Pat. No. 5,648,508, these can also be prepared by an electrochemical route. In this regard, reference may be made to DE-A 103 55 087 and WO-A 2005/049892. The MOFs prepared by this route have particularly good properties in respect of the adsorption and desorption of chemical substances, in particular gases. They differ in this way from those prepared in a conventional way even if these are made from the same organic and metal ion constituents and are therefore to be regarded as a new framework. For the purposes of the present invention, electrochemically prepared MOFs are particularly preferred.

Accordingly, the electrochemical preparation relates to a crystalline porous metal organic framework which comprises at least one at least bidentate organic compound coordinated to at least one metal ion and is obtained in a reaction medium comprising the at least one bidentate organic compound by at least one metal ion being produced by oxidation of at least one anode comprising the corresponding metal.

The term "electrochemical preparation" refers to a method of preparation in which the formation of at least one reaction product is associated with the migration of electric charges or the occurrence of electric potentials.

The term "at least one metal ion" as is used in connection with the electrochemical preparation refers to embodiments in which at least one ion of a metal or at least one ion of a first metal and at least one ion of at least one second metal which is different from the first metal is provided by anodic oxidation.

Accordingly, the electrochemical preparation comprises embodiments in which at least one ion of at least one metal is provided by anodic oxidation and at least one ion of at least one metal is provided via a metal salt, with the at least one metal in the metal salt and the at least one metal which is provided as metal ion by means of anodic oxidation being able to be identical or different. The present invention therefore comprises with regard to electrochemically prepared MOFs, for example, an embodiment in which the reaction medium comprises one or more different salts of a metal and the metal ion comprised in this salt or in these salts is additionally provided by anodic oxidation of at least one anode comprising this metal. Likewise, the reaction medium can comprise one or more different salts of at least one metal and at least one metal which is different from these metals can be provided as metal ion by means of anodic oxidation in the reaction medium.

In a preferred embodiment of the invention in connection with the electrochemical preparation, the at least one metal ion is provided by anodic oxidation of at least one anode comprising this at least one metal, with no further metal being provided via a metal salt.

The term "metal" as used for the purposes of the present invention in connection with the electrochemical preparation of MOFs comprises all elements of the Periodic Table which can be provided in a reaction medium by an electrochemical route involving anodic oxidation and are able to form at least one porous metal organic framework with at least one at least bidentate organic compound.

Regardless of its method of preparation, the MOF is obtained in powder form or as agglomerate. This can be used as such as sorbent in the process of the invention either alone or together with other sorbents or further materials. It is preferably used as loose material, in particular in a fixed bed. Furthermore, the MOF can be converted into a shaped body. Preferred processes here are extrusion or tableting. In the production of shaped bodies, further materials such as binders, lubricants or other additives can be added to the MOF. It is likewise conceivable for mixtures of MOF and other adsorbents, for example activated carbon, to be produced as shaped bodies or separately form shaped bodies which are then used as mixtures of shaped bodies.

The possible geometries of these shaped MOF bodies are subject to essentially no restrictions. Examples are, inter alia, pellets such as circular pellets, pills, spheres, granules, extrudates such as rods, honeycombs, grids or hollow bodies.

To produce these shaped bodies, all suitable processes are possible in principle. The following procedures are particularly preferred:

kneading of the framework either alone or together with at least one binder and/or at least one pasting agent and/or at least one template compound to give a mixture; shaping of the resulting mixture by means of at least one suitable method such as extrusion; optional washing and/or drying and/or calcination of the extrudate; optional finishing treatment.

Application of the framework to at least one porous or nonporous support material. The material obtained can then be processed further to produce a shaped body by the above-described method.

Application of the framework to at least one porous or nonporous substrate.

Foaming into porous polymers such as polyurethane.

Kneading and shaping can be carried out by any suitable method, as described, for example, in Ullmann's Enzyklopädie der Technischen Chemie 4, 4th edition, volume 2, p. 313 ff. (1972), whose relevant contents are hereby fully incorporated by reference into the present patent application.

Kneading and/or shaping can, for example, preferably being carried out by means of a piston press, roller press in the presence or absence of at least one binder material, compounding, pelletization, tableting, extrusion, coextrusion, foaming, spinning, coating, granulation, preferably spray granulation, spraying, spray drying or a combination of two or more of these methods.

Very particular preference is given to producing pellets, extrudates and/or tablets.

The kneading and/or shaping can be carried out at elevated temperatures, for example in the range from room temperature to 300° C., and/or at superatmospheric pressure, for example in the range from atmospheric pressure to a few hundred bar, and/or in a protective gas atmosphere, for example in the presence of at least one noble gas, nitrogen or a mixture of two or more thereof.

The kneading and/or shaping is, in a further embodiment, carried out with addition of at least one binder which can in principle be any chemical compound which ensures a viscosity of the composition to be kneaded and/or shaped which is desired for kneading and/or shaping. Accordingly, binders can, for the purposes of the present invention, be either viscosity-increasing or viscosity-reducing compounds.

Preferred binders are, for example, aluminum oxide or binders comprising aluminum oxide, as described, for example, in WO 94/29408, silicon dioxide, as described, for example, in EP 0 592 050 A1, mixtures of silicon dioxide and aluminum oxide, as described, for example, in WO 94/13584, clay minerals as described, for example, in JP 03-037156 A, for example montmorillonite, kaolin, bentonite, hallosite, dickite, nacrite and anauxite, alkoxysilanes as described, for example, in EP 0 102 544 B1, for example tetraalkoxysilanes such as tetramethoxysilane, tetraethoxysilane, tetrapropoxysilane, tetrabutoxysilane, or, for example, trialkoxysilanes such as trim ethoxysilane, triethoxysilane, tripropoxysilane, tributoxysilane, alkoxytitanates, for example tetraalkoxytitanates such as tetramethoxytitanate, tetraethoxytitanate, tetrapropoxytitanate, tributoxytitanate, or, for example, trialkoxytitanates, such as trimethoxytitanate, triethoxytitanate, tripropoxytitanate, tributoxytitanate, alkoxyzirconates, for example tetraoxyzirconates such as tetramethoxyzirconate, tetraethoxyzirconate, tetrapropoxyzirconate, tetrabutoxyzirconate, or, for example, trialkoxyzirconates such as trimethoxyzirconate, triethoxyzirconate, tripropoxyzirconate, tributoxyzirconate, silica sols, amphiphilic substances and/or graphite. Particular preference is given to graphite.

As viscosity-increasing compound, it is possible to use, if appropriate in addition to the abovementioned compounds, for example, an organic compound and/or a hydrophilic polymer such as cellulose or a cellulose derivative such as methylcellulose and/or a polyacrylate and/or a polymethacrylate and/or a polyvinyl alcohol and/or a polyvinyl pyrrolidone and/or a polyisobutene and/or a polytetrahydrofuran.

As pasting agent, it is possible to use, inter alia, preferably water or at least one alcohol such as a monoalcohol having from 1 to 4 carbon atoms, for example methanol, ethanol, n-propanol, isopropanol, 1-butanol, 2-butanol, 2-methyl-1-propanol or 2-methyl-2-propanol or a mixture of water and at least one of the alcohols mentioned or a polyhydric alcohol such as a glycol, preferably a water-miscible polyhydric alcohol, either alone or in admixture with water and/or at least one of the monohydric alcohols mentioned.

Further additives which can be used for kneading and/or shaping are, inter alia, amines or amine derivatives such as tetraalkylammonium compounds or amino alcohols and carbonate-comprising compounds, e.g. calcium carbonate. Such further additives are described, for instance, in EP 0 389 041 A1, EP 0 200 260 A1 or WO 95/19222.

The order of addition of the additives such as template compound, binder, pasting agent, viscosity-increasing substance in shaping and kneading is in principle not critical.

In a further preferred embodiment, the shaped body obtained after kneading and/or shaping is subjected to at least one drying step which is generally carried out at a temperature in the range from 25 to 300° C., preferably in the range from 50 to 300° C. and particularly preferably in the range from 100 to 300° C. It is likewise possible to carry out drying under reduced pressure or under a protective gas atmosphere or by spray drying.

In a particularly preferred embodiment, at least one of the compounds added as additives is at least partly removed from the shaped body during this drying process.

The invention claimed is:

1. Hydrogen or methane gas pressure container having a minimum volume of 1 $m^3$ and a prescribed maximum filling pressure, wherein the gas pressure container has a filter through which hydrogen or methane respectively, can flow during uptake, wherein the filter has an adsorbent for adsorbing impurities selected from the group consisting of a higher hydrocarbon, ammonia, an odorous substance, hydrogen sulfide and a mixture of two or more of these substances, wherein the pressure container and the filter comprise porous metal organic frameworks as adsorbent, and wherein the porous metal organic framework comprises at least one bidentate organic compound which is derived from a dicarboxylic, tricarboxylic or tetracarboxylic acid or a sulfur analogue thereof.

2. The gas pressure container according to claim 1, wherein the maximum filling pressure is 150 bar (absolute).

3. A method of using a gas pressure container according to claim 1 for filling a further gas pressure container which is present in or on a vehicle and comprises an adsorbent for storage of hydrogen or methane.

* * * * *